United States Patent
Wassef et al.

(10) Patent No.: US 9,734,699 B2
(45) Date of Patent: Aug. 15, 2017

(54) SYSTEM FOR PROVIDING ALERTS TO VEHICLE OCCUPANTS

(71) Applicant: GM GLOBAL TECHNOLOGY OPERATIONS LLC, Detroit, MI (US)

(72) Inventors: Andrew Wassef, Rochester, MI (US); Walter M. Lazar, II, Howell, MI (US); Brian D. Paul, Farmington Hills, MI (US); Raymond J. Kiefer, Huntington Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/732,120

(22) Filed: Jun. 5, 2015

(65) Prior Publication Data

US 2016/0358453 A1    Dec. 8, 2016

(51) Int. Cl.
| | |
|---|---|
| *B60Q 1/00* | (2006.01) |
| *G08B 25/01* | (2006.01) |
| *G08B 6/00* | (2006.01) |
| *B60Q 9/00* | (2006.01) |
| *B60R 21/0134* | (2006.01) |
| *G08B 25/10* | (2006.01) |
| *B60R 16/02* | (2006.01) |

(52) U.S. Cl.
CPC ........... *G08B 25/016* (2013.01); *B60Q 9/008* (2013.01); *B60R 16/02* (2013.01); *B60R 21/0134* (2013.01); *G08B 6/00* (2013.01); *G08B 25/10* (2013.01)

(58) Field of Classification Search
CPC ...... G08B 21/24; G08B 21/02; B60R 25/102; B60R 25/33; B60R 25/1004; B60R 2325/205
USPC .............. 340/426.18–426.22, 436, 457–467
See application file for complete search history.

(56) References Cited

U.S. PATENT DOCUMENTS

| | | |
|---|---|---|
| 7,245,231 B2 | 7/2007 | Kiefer |
| 8,694,222 B2 | 4/2014 | Zagorski |
| 8,970,358 B2 | 3/2015 | Kiefer et al. |
| 2012/0028577 A1* | 2/2012 | Rodriguez ....... H04N 21/44008 455/41.1 |
| 2012/0232742 A1* | 9/2012 | Elliott ..................... H04L 67/12 701/29.7 |
| 2013/0057397 A1 | 3/2013 | Cutler et al. |

(Continued)

*Primary Examiner* — Kerri McNally
*Assistant Examiner* — Sharmin Akhter
(74) *Attorney, Agent, or Firm* — Reising Ethington, P.C.

(57) ABSTRACT

A method and system for generating an alert to one or more occupants of a vehicle are provided. In one embodiment, the method includes receiving an input signal from a vehicle safety system. The input signal is indicative of an alert condition (e.g. an impending collision). The method further includes generating an output signal responsive to said input signal and wirelessly transmitting the output signal to the portable device. The portable device, such as a cellular communications device, has a haptic actuator and is configured to be mechanically disconnected from the vehicle while in physical contact with an occupant of the vehicle. The output signal, which may be transmitted directly to the portable device using short-range wireless communication protocols, is configured to activate the haptic actuator to cause a vibratory movement of the portable device and alert the vehicle occupant to the alert condition.

20 Claims, 4 Drawing Sheets

(56) References Cited

U.S. PATENT DOCUMENTS

| | | | |
|---|---|---|---|
| 2013/0342335 A1* | 12/2013 | McQueen | G08B 6/00 340/436 |
| 2014/0266811 A1* | 9/2014 | Flick | G08G 1/127 340/993 |
| 2015/0102929 A1* | 4/2015 | Grinenval | B60K 28/06 340/576 |
| 2015/0246639 A1* | 9/2015 | Nagata | B60Q 9/008 340/435 |
| 2015/0314681 A1* | 11/2015 | Riley, Sr. | B60K 28/066 340/576 |

* cited by examiner

SYSTEM FOR PROVIDING ALERTS TO VEHICLE OCCUPANTS

FIELD

The present invention relates generally to a vehicle system. More specifically, the invention relates to a method and system to provide alerts to vehicle occupants through haptic actuators in portable devices that are in physical contact with the occupants, but mechanically disconnected from the vehicle.

BACKGROUND

Most modern vehicles include a variety of safety systems designed to alert driver or other occupants to operational or environmental conditions that can pose a risk to vehicle occupants. Conventional vehicle safety systems may include, for example, forward or rear collision warning systems, land departure warning systems, and side and rear object detection systems among others. When a safety system detects a condition that creates a risk to the vehicle and/or its occupants, a signal is generated and that signal is translated into an alert to the driver and/or other occupants by a warning system. The warning system may comprise an audio device that generates a sound (e.g., a beep or chime) or message. Alternatively, the warning system may comprise a haptic actuator that generates a vibration felt by a vehicle occupant through, for example, a vehicle seat.

Existing systems for providing audio alerts to vehicle occupants have drawbacks. Vehicle occupants can find audio alerts annoying leading to consumer dissatisfaction and the disabling of safety systems; thereby reducing the potential safety benefits. Audio alerts may also be ineffective for hearing-impaired occupants. Haptic alerts overcome some of the drawbacks of audio alerts and have been found to better communicate the location of the risk to the vehicle and/or its occupants (e.g., vibrating the front, back, left or right of the driver's seat bottom), since it can be difficult to localize a sound in a reverberant in-cab environment. Haptic alerts are, however, relatively complex and can add significant cost and complexity to the vehicle.

SUMMARY

According to one embodiment, there is provided a method for generating an alert to one or more occupants of a vehicle. The method may include receiving an input signal from a vehicle safety system. The input signal is indicative of an alert condition. The method may further include the steps of generating an output signal responsive to the input signal and wirelessly transmitting the output signal to a portable device having a haptic actuator. The portable device is configured to be mechanically disconnected from the vehicle while in physical contact with an occupant of the vehicle. The output signal is configured to activate the haptic actuator to cause a vibratory movement of the portable device.

According to another embodiment, there is provided a method for generating an alert to one or more occupants of a vehicle. The method may include receiving a first input signal from a first vehicle safety system. The first input signal is indicative of a first alert condition. The method may further include receiving a second input signal from one of the first vehicle safety system and a second vehicle safety system. The second input signal is indicative of a second alert condition different from the first alert condition. The method may further include the steps of generating a first output signal responsive to the first input signal, generating a second output signal responsive to the second input signal and wirelessly transmitting the first and second output signals to a portable device having a haptic actuator. The portable device is configured to be mechanically disconnected from the vehicle while in physical contact with an occupant of the vehicle. The first output signal is configured to activate the haptic actuator to cause a first vibratory movement of the portable device. The second output signal is configured to activate the haptic actuator to cause a second vibratory movement of the portable device. The second vibratory movement is different from the first vibratory movement in at least one of duration, frequency and intensity. The method may further include the steps of associating the first vibratory movement with the first input signal responsive to a first configuration signal and associating the second vibratory movement with the second input signal responsive to a second configuration signal.

According to another embodiment, there is provided a system for generating an alert to one or more occupants of a vehicle. The system may include a vehicle safety system. The system further includes a controller coupled to the vehicle safety system. The controller is configured to receive an input signal from the vehicle safety system. The input signal is indicative of an alert condition. The controller is further configured to generate an output signal responsive to the input signal and to wirelessly transmit the output signal to a portable device having a haptic actuator. The portable device is configured to be mechanically disconnected from the vehicle while in physical contact with an occupant of the vehicle. The output signal is configured to activate the haptic actuator to cause a vibratory movement of the portable device.

DRAWINGS

Preferred exemplary embodiments will hereinafter be described in conjunction with the appended drawings, wherein like designations denote like elements, and wherein.

DESCRIPTION

Figure 1:
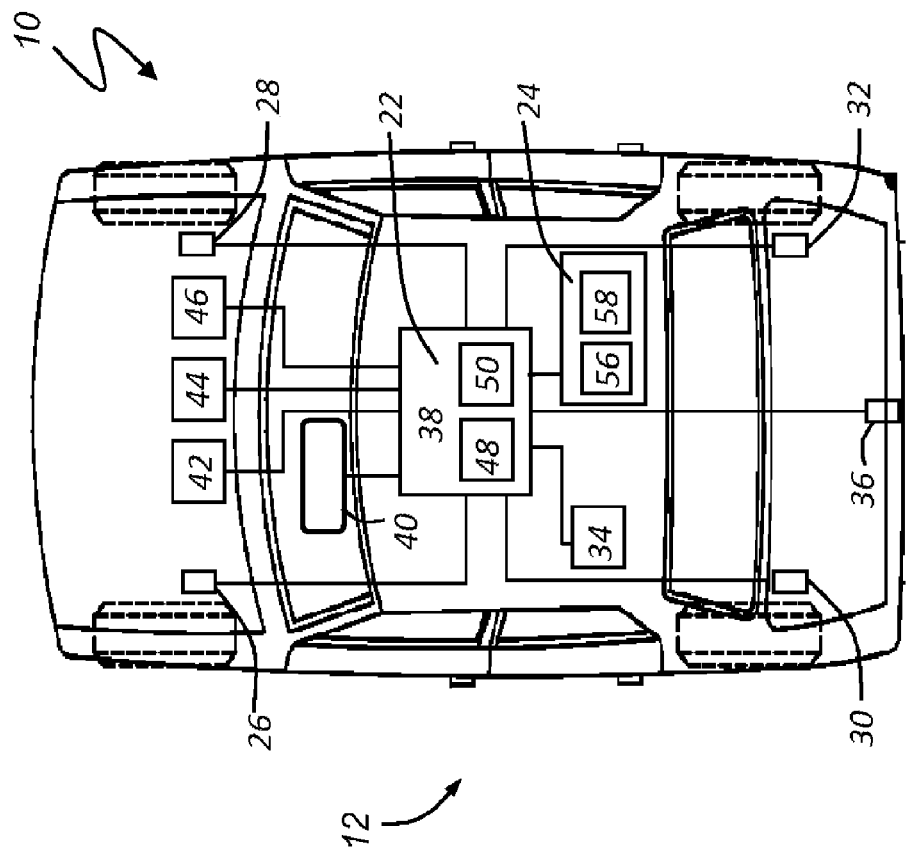
FIG. 1 is a schematic view of a vehicle including one embodiment of a system for generating an alert to one or more occupants of the vehicle.
Figure 2:
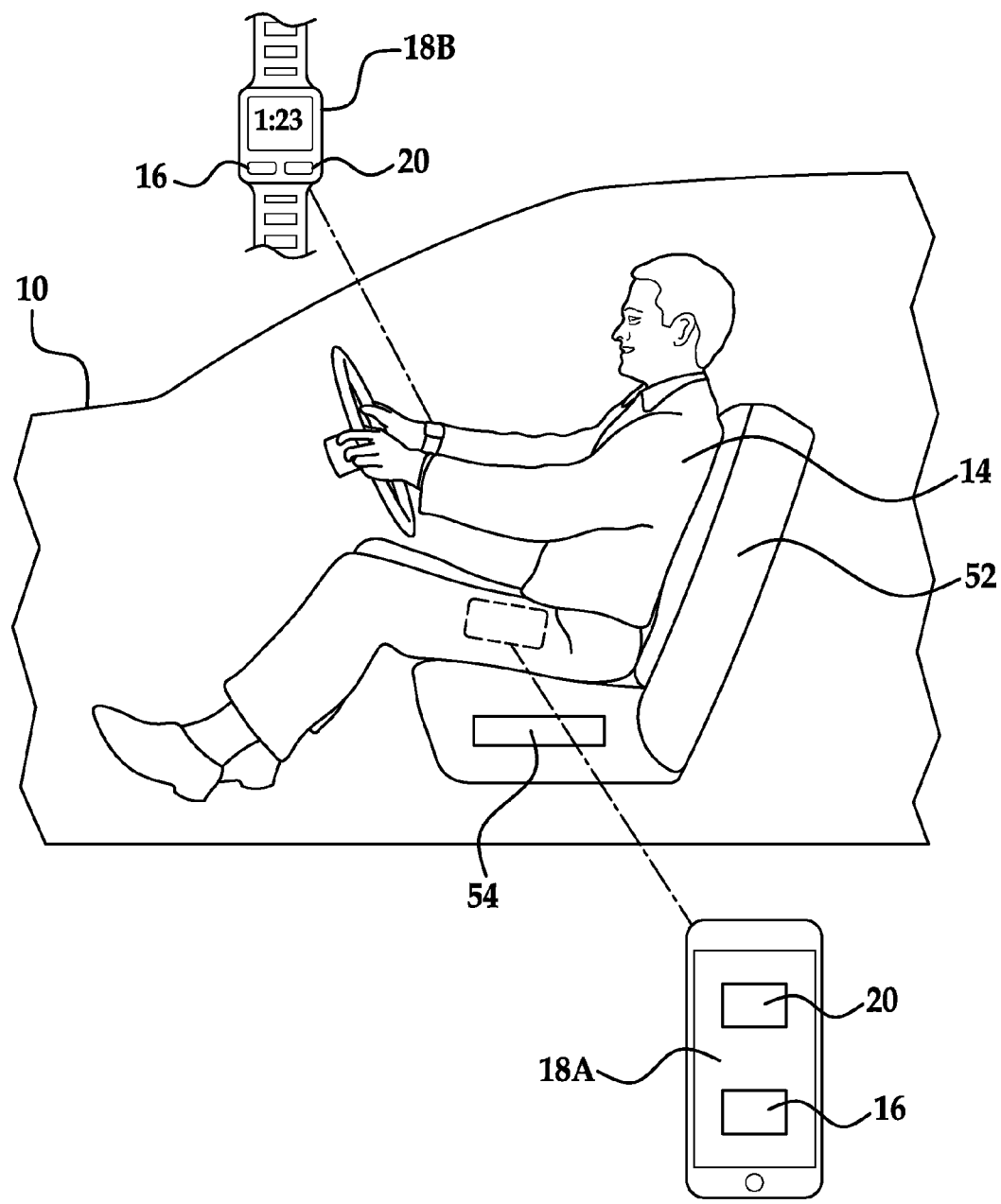
FIG. 2 is a schematic view of a portion of the vehicle of FIG. 1.

Referring now to the drawings wherein like reference numerals are used to identify identical components in the various views, FIGS. 1-2 illustrate a vehicle 10 including one embodiment of a system 12 for generating an alert to one or more occupants 14 of vehicle 10. In accordance with one aspect of the invention, system 12 provides alerts to occupants 14 by configuring and transmitting signals to activate one or more haptic actuators 16 in portable devices 18A, 18B that are mechanically disconnected from vehicle 10, but in physical contact with occupants 14. As used herein, haptic alerts refer to any warning that is presented through the proprioceptive (or kinesthetic) or touch-based, tactile senses. Devices 18A, 18B are "portable" in that devices 18A, 18B can be moved relative to vehicle 10 (typically by actions of the occupants 14). Devices 18A, 18B are mechanically disconnected from vehicle 10 in that devices 18A, 18B do not have a physical connection to vehicle 10 by, for example, a cable or mechanical or electro-mechanical coupling. Portable devices 18A, 18B are in physical contact with occupants in that an occupant 14 can sense movement of the haptic actuators 16 in devices 18A, 18B. In this sense, physical contact includes direct physical contact between devices 18A, 18B and occupants 14 and indirect contact sufficient to permit occupants 14 to sense movements caused by actuators 16 (e.g., through clothing worn by the occupant 14). In the illustrated embodiment, portable device 18A comprises a cellular communication device and, in particular, a cellular phone. Portable device 18B comprises a wearable device such as a watch, bracelet, glasses, physical fitness monitor, glove, etc. that is configured to be supported by a body member of a vehicle occupant 14 such as the head, ears, neck, torso, arm or wrist of the occupant 14. It should be understood, however, that system 12 may be used with other portable devices. In addition to haptic actuators 16, each portable device 18A, 18B includes a wireless receiver or transceiver 20 for communication with system 12. Devices 18A, 18B may further include conventional memory devices, electronic processing devices (e.g., a microprocessor, microcontroller or application specific integrated circuit (ASIC)), and input/output devices (e.g., keypad, touch screens, etc.)). It should be appreciated that the present system and method may be used with any type of vehicle, including traditional vehicles, hybrid electric vehicles (HEVs), extended-range electric vehicles (EREVs), battery electrical vehicles (BEVs), motorcycles, passenger vehicles, sports utility vehicles (SUVs), cross-over vehicles, trucks, vans, buses, recreational vehicles (RVs), etc. System 12 may include a vehicle safety system 22 and a controller 24.

Safety system 22 is provided to detect a condition that creates a risk to vehicle 10 and/or the occupants 14 of vehicle 10 and to alert the occupants 14 to the condition and/or cause the vehicle 10 to act in a manner to reduce or eliminate the risk. In certain embodiments, system 22 comprises a collision mitigation and avoidance system that detects and attempts to mitigate or avoid collisions with objects external to vehicle 10 such as a forward collision warning system, front automatic braking system, forward or rear park assist system, lane departure warning system, side blind zone alert system, side or rear object detection system, or rear automatic braking system. In another embodiment, system 22 may comprise a vehicle speed warning or control system. System 22 may include a variety of sensors 26, 28, 30, 32, 34, 36, a control module 38 and a user interface 40.

Sensors 26, 28, 30, 32, 34, 36 are provided to detect a variety of conditions and may include, for example, sensors 26, 28, 30, 32 that detect operating conditions of vehicle 10, sensors 32 that detect environmental conditions relating to the operating environment of the vehicle, and sensors 34 that detect characteristics of objects external to the vehicle (e.g., other vehicles, guardrails, etc.) including the presence or absence of such objects, the position or change in position of such objects, and movements of such objects. In the illustrated embodiment, sensors 26, 28, 30, 32, 34, 36 are all mounted on vehicle 10. It should be understood, however, that system 22 may also or alternatively include sensors that are not mechanically connected to the vehicle including sensors that are affixed to other vehicles, infrastructure (e.g., a guardrail, sign, etc.) or even persons and that communicate information to control module 38. Sensors 26, 28, 30, 32, 34, 36 may be embodied in hardware, software, firmware or some combination thereof. Sensors 26, 28, 30, 32, 34, 36 may directly sense or measure the conditions for which they are provided, or they may indirectly evaluate such conditions based on information provided by other sensors, components, devices, modules, systems, etc. Sensors 26, 28, 30, 32, 34, 36 may be directly coupled to control module 38, indirectly coupled via other electronic devices, a vehicle communications bus, network, etc., or coupled according to some other arrangement known in the art. Sensors 26, 28, 30, 32, 34, 36 may be integrated within another vehicle component, device, module, system, etc. (e.g., sensors that are already a part of an engine control module (ECM), traction control system (TCS), electronic stability control (ESC) system, antilock brake system (ABS), etc.), may be stand-alone components (as schematically shown in FIG. 1), or they may be provided according to some other arrangement. In some instances, multiple sensors might be employed to sense a single parameter (e.g., for providing redundancy). It should be appreciated that the foregoing scenarios represent only some of the possibilities, as any type of suitable sensor arrangement may be used by vehicle safety system 22. Sensors 26, 28, 30, 32, 34, 36 may employ variety of different sensing techniques depending on the application.

In the example shown in FIG. 1, sensors 26, 28, 30, 32 comprise individual wheel speed sensors that are coupled to each wheel of vehicle 10 and separately report the rotational velocity of each wheel. Skilled artisans will appreciate that sensors 26, 28, 30, 32 may operate according to optical, electromagnetic or other technologies, and that other parameters may be derived or calculated from the velocity readings, such as vehicle acceleration. In another embodiment, sensors 26, 28, 30, 32 determine vehicle speed relative to the ground by directing radar, laser and/or other signals towards the ground and analyzing the reflected signals, or by employing feedback from a navigation module (not shown) that has Global Positioning System (GPS) capabilities.

Sensor 34 provides vehicle safety system 22 with one or more outside or environmental readings that may be used to detect and/or evaluate current environmental conditions that may affect vehicle 10. For example, environmental sensor 34 may include an outside temperature sensor, an outside humidity sensor, a precipitation sensor, or any other type of sensor that senses or gathers environmental readings. The outside temperature sensor may sense ambient air temperatures, and may do so in any number of different ways. Environmental sensor 34 may determine environmental conditions by direct sensing and measurement of environmental readings, indirect determination of environmental readings by gathering data from other modules or systems in the vehicle, or by receiving wireless transmissions that include weather reports, forecasts, etc. from a weather-related service or website. In the last example, the wireless transmissions may be received at a telematics unit which then conveys the pertinent environmental data to control module 38. Other examples of environmental sensors are possible as well. As illustrated in the exemplary embodiment of FIG. 1, environmental sensor 34 may be mounted to vehicle 10 and be coupled to control module 38 through suitable communication means such as a vehicle communications bus.

Sensor 36 detects characteristics of objects proximate vehicle 10 (e.g., other vehicles, guardrails, etc.) including the presence or absence of such objects, the position or change in position of such objects, and movements of such objects. In the illustrated embodiment, sensor 36 may be used to detect the presence, position or movement of vehicles or other objects behind vehicle 10. In the case of a moving object, sensor 36 may generate signals indicative of the position, velocity and/or acceleration of the object. The information conveyed by the signals may be absolute in nature (e.g., a velocity or acceleration of the object that is relative to ground) or relative in nature (e.g., a relative velocity or acceleration that is a difference between the velocities or accelerations of vehicle 10 and the object). Sensor 36 may comprise a single sensor a combination of sensors and may comprise a light detection and ranging (LIDAR) device, ultrasonic device, radio detection and ranging (RADAR) device, vision device (e.g., camera, etc.), a vehicle-to-vehicle communication device, or a combination thereof.

Control module 38 may process signals generated by sensors 26, 28, 30, 32, 34, 36 and may communicate with user interface 40 to provide warnings to vehicle occupants 14 and communicate with control modules for various vehicle systems—including, for example, the engine control module 42, brake control module 44 and/or steering control module 46—to control the operation of such systems in an attempt to mitigate or avoid a safety risk such as a collision. Control module 38 may include a variety of electronic processing devices, memory devices, input/output (I/O) devices, and/or other known components, and may perform various control and/or communication related functions. In an exemplary embodiment, control module 38 includes an electronic memory device 48 that stores various sensor readings (e.g., sensor readings from sensors 26, 28, 30, 32, 34, 36), look up tables or other data structures, software programs, etc. Memory device 48 may also store pertinent characteristics and background information pertaining to vehicle 10, such as information relating to stopping distances, deceleration limits, temperature limits, moisture or precipitation limits, vehicle settings, personalized driver settings, driving habits or other driver behavioral data, etc. Control module 38 may also include an electronic processing device 50 (e.g., a microprocessor, a microcontroller, an application specific integrated circuit (ASIC), etc.) that executes instructions for software, firmware, programs, algorithms, scripts, etc. that are stored in memory device 48. Depending on the particular embodiment, control module 38 may be a stand-alone vehicle electronic module (e.g., an object detection controller, a safety controller, etc.), it may be incorporated or included within another vehicle electronic module (e.g., a park assist control module, brake control module, steering control module, etc.), or it may be part of a larger network or system (e.g., a traction control system (TCS), electronic stability control (ESC) system, antilock brake system (ABS), driver assistance system, adaptive cruise control system, lane departure warning system, etc.), to name a few possibilities. Control module 38 may be electronically connected to other vehicle devices, modules and systems—including, for example, the engine control module 42, brake control module 44 and/or steering control module 46—via a vehicle communications bus or other communication means and can interact with them when required. It should be understood that, like control module 38, engine control module 42, brake module 44 and steering module 46 may include a variety of electronic processing devices, memory devices, input/output (I/O) devices, and/or other known components, may perform various control and/or communication related functions, and may be electronically connected to other vehicle devices and modules via a suitable vehicle communications network and interact with them when required. Depending on the particular embodiment, these modules 42, 44, 46 may be stand-alone components (as schematically illustrated in FIG. 1), they may be incorporated or included within other vehicle modules or within each other, or they may be part of a larger network or system (such as engine management system, powertrain system, vehicle safety system, etc.) to name a few possibilities. It should be appreciated that engine control modules, brake control modules and steering control modules are well known in the art and are, therefore, not described here in detail. Some examples of such modules that may be particularly useful with exemplary system 22 include those that utilize drive-by-wire, brake-by-wire and steer-by-wire technologies. Vehicle safety system 22 is not limited to any particular module or module arrangement.

User interface 40 exchanges information or data with occupants 14 of vehicle 10 and may include any combination of visual, audio, haptic and/or other types of components for doing so. User interface 40 may be a stand-alone module or may be part of an infotainment system or part of some other module, device or system in the vehicle. Depending on the particular embodiment, user interface 40 may include an input/output device that can both receive information from and provide information to the occupants 14 (e.g., a touch-screen display on a center stack/console or a voice-recognition human-machine interface (HMI)), an input device only (e.g., a microphone), an output device only (e.g., a speaker, an instrument panel gauge, or a visual indicator on the rear-view mirror), or some other component. Referring to FIG. 2, in accordance with one embodiment, user interface 40 includes an output device comprising a haptic device in the form of a vehicle seat 52 having one or more haptic actuators 54 that provide haptic alerts to an occupant 14 of vehicle 10 to indicate an alert condition.

Controller 24 is provided to generate and transmit signals used to control haptic actuators 16 in portable devices 18A, 18B. Controller 24 may include a variety of memory devices, electronic processing devices, input/output (I/O) devices, and/or other known components, and may perform various control and/or communication related functions. In an exemplary embodiment, controller 24 includes an electronic memory device 56 that stores look up tables or other data structures and algorithms (e.g., the algorithm embodied in the exemplary method described below), etc. Controller 24 may also include an electronic processing device 58 (e.g., a microprocessor, a microcontroller, an application specific integrated circuit (ASIC), etc.) that executes instructions for software, firmware, programs, algorithms, scripts, etc. that are stored in memory device 56. Controller 24 may also include an input/output interface through which controller 24 may receive input signals including signals generated by vehicle safety system 12 and generate output signals including those used to control haptic actuators 16. The input/output interface may include a wireless transceiver for communication with transceivers 20 in portable devices 18A, 18B. Depending on the particular embodiment, controller 24 may be a stand-alone vehicle electronic module, it may be incorporated or included within another vehicle electronic module (e.g., control module 38), or it may be part of a larger network or system. Controller 24 may be electronically connected to other vehicle devices, modules and systems—including, for example, control module 38 via a vehicle communications bus or suitable communications and can interact with them when required.

Figure 3:
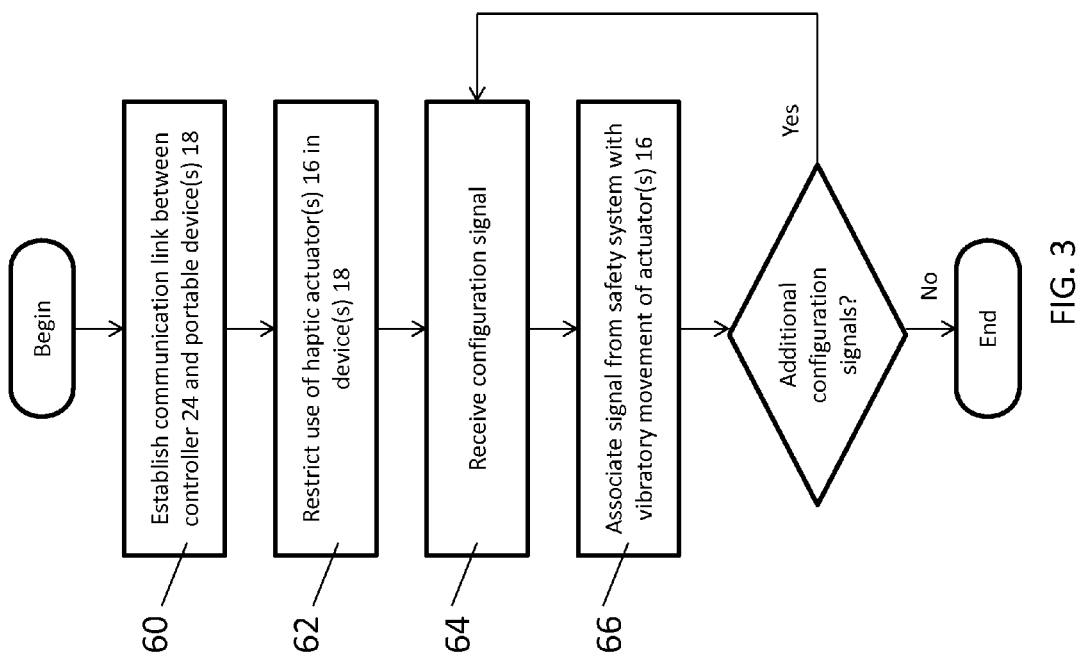
FIGS. 3-4 are flowcharts illustrating embodiments of a method for generating an alert to one or more occupants of a vehicle.

In accordance with one embodiment controller 24 is configured with appropriate programming instructions or code (i.e., software) to perform several steps in a method for generating alerts to one or more occupants 14 of vehicle 10. The code may be stored in memory device 56 of controller 24 and may be uploaded to memory device 56 from, a conventional computer storage medium. Referring now to FIG. 3, the method may include several steps associating with a configuration mode of system 12 in which system 12 is configured or otherwise set up and customized for use by occupants 14 of vehicle 10. In step 60, a communication link is established between system 12 and one or more portable devices 18A, 18B for one or more occupants 14 of vehicle 10. The communications link may comprise a short-wave wireless communications link designed to enable communications with a distance of ten meters or less and may comprise, for example, a Bluetooth communications link, or a ZigBee communications link. Once the link is established, system 12 may, in step 62, generate and transmit signals to the portable devices 18A, 18B (or the occupants 14 may provide input to the portable devices 18A, 18B directly), to restrict use of the haptic actuators 16 in linked portable devices 18A, 18B to communications from system 12 in order to prevent confusion from other potential uses of haptic actuators 16 such as activation from incoming cellular communications (communications could, however, still be received by devices 18A, 18B and conveyed to the occupants 14 through other conventional means including the vehicle speakers, instrument panel or a display screen in vehicle 10).

In step 64, controller 24 may receive a configuration signal used to configure system 12 for use with a given portable device 18A, 18B. The configuration signal may be generated in response to an input by occupant 14. The input may be provided through an input/output device on portable device 18A, 18B (e.g., through a graphical user interface on portable device 18A, 18B generated by activating a software application on portable device 18A, 18B) or through an input/output device on vehicle 10 such as user interface 40. The configuration signal may, for example, be used by the occupant to associate different signals generated by vehicle safety system 22 with different vibratory movements of haptic actuator 16 on device 18A, 18B. In particular, the frequency, intensity or duration of movement may be varied in order to convey different safety conditions indicated by vehicle safety system 22. Accordingly, in step 66 controller may associate a vibratory movement with a particular signal from safety system 22 in response to the configuration signal. This process may be repeated to permit an occupant to customize the type of vibratory movement that will occur in response to various safety conditions. Alternatively, the initial configuration signal may result in selection of a previously stored correlation between one or more vibratory movements and corresponding safety conditions created by a vehicle manufacturer or a vehicle user in a data structure within memory device 56 or another memory device.

Figure 4:
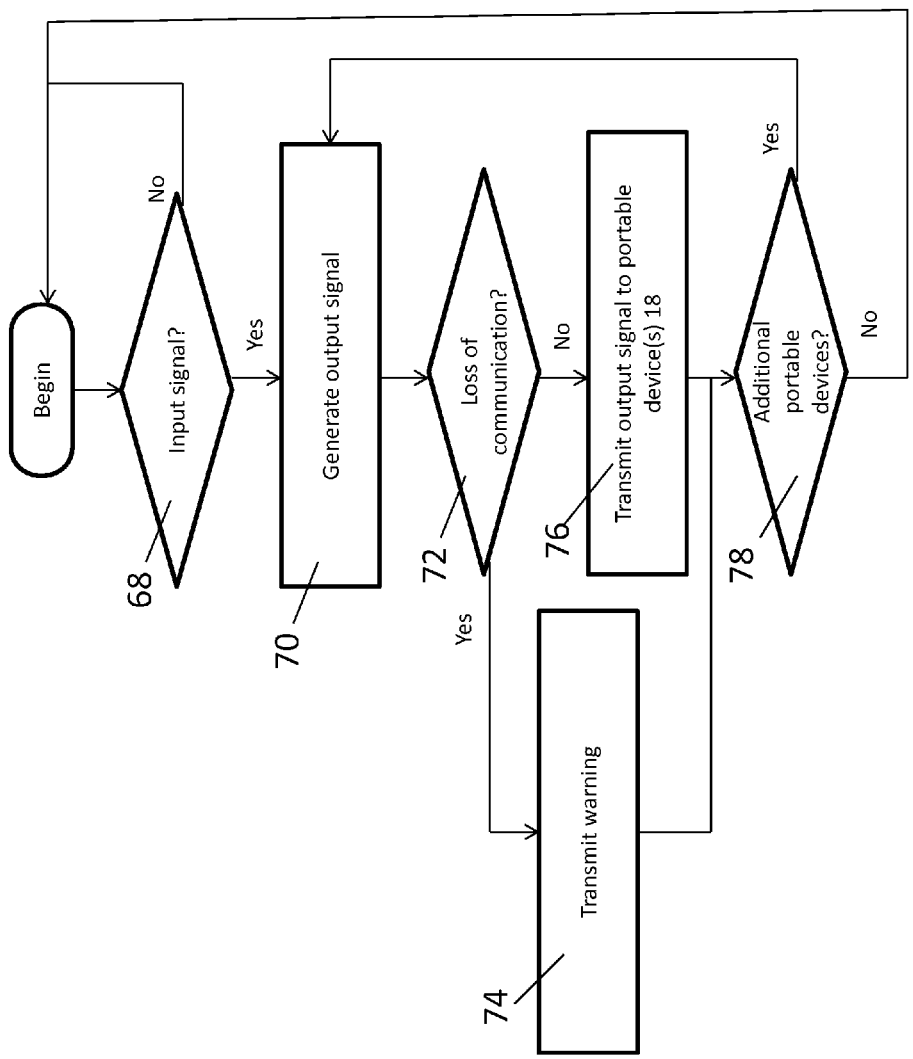

Referring now to FIG. 4, the method for generating alerts to one or more occupants of vehicle 10 may also include several steps associating with an operating mode of system 12. In step 68, controller 24 receives an input signal from vehicle safety system 22 that is indicative of an alert condition. Where vehicle safety system 22 comprises a collision mitigation and avoidance system, the input signal may indicate a risk of collision with another vehicle or object on the front, rear or side of vehicle 10. The input signal may be received by controller 24 over a vehicle communications bus to which system 22 and controller 24 are coupled.

In step 70, controller 24 generates an output signal responsive to the input signal. Step 70 may include the substep of configuring the output signal for short-range wireless transmission to a portable device 18A, 18B. As noted above, a short-range communications link (e.g. Bluetooth, Zigbee, etc.) may be established between system 12 and portable device 18A, 18B. Controller 24 may be configured to format the output signal in a predefined format for communication to device 18A, 18B. The signal format may include, for example, information regarding the sender and receiver (e.g., address information), error detection and correction information, and data relating to the detected alert condition.

In step 72 controller 24 may determine whether there has been any loss of communication between controller 24 and the portable device 18A, 18B (i.e., whether the communications link is no longer present). A loss of communication could occur because, for example, portable device 18A, 18B has been removed from vehicle 10 or otherwise moved outside of the range of communication, the vehicle occupant 14 has turned off or disabled device 18A, 18B, power is no longer available to device 18A, 18B or device 18A, 18B has been damaged. If a loss of communication is detected, controller 24 may, in step 74, generate and transmit an output signal to a vehicle system that is capable of delivering a warning to occupant(s) 14 indicative of the loss of communication. The system may comprise an audio warning system, a visual warning system or a haptic warning system (e.g., vehicle seat 52) and may be delivered over a vehicle communications bus to which controller 24 and the warning system are connected.

If no loss of communication is detected, in step 76 controller 24 may wirelessly transmit the output signal to portable device 18A, 18B. In accordance with one aspect of the invention, controller 24 may transmit the output signal directly to portable device 18A, 18B over a short-range wireless communications link (as opposed to using, for example, indirect communications such as cellular communications). The output signal is configured to activate haptic actuator 16 in portable device 18A, 18B to cause a vibratory movement of device 18A, 18B and thereby alert an occupant 14 of vehicle 10 to a particular safety condition.

In certain cases it may be desirable to transmit information regarding the same alert condition to multiple portable devices 18A, 18B or to another warning system in vehicle 10. For example, an individual occupant 14 may establish communication links between controller 24 and multiple portable devices 18A, 18B that are in physical contact with the occupant 14 to provide an added measure of safety through redundancy or to enable the occupant 14 to use at least one of the portable devices for another function (e.g., handing a cellular communications device 18A to another occupant 14 to make or receive a telephone call while maintaining physical contact with a wearable portable device 18B). In another embodiment, multiple occupants 14 may establish communication links between controller 24 and one or more portable devices 18A, 18B in physical contact with each occupant 14 so that multiple occupants 14 are able to receive certain warnings (e.g. warnings indicating an impending crash). In yet another embodiment, one or more individuals located outside of vehicle 10 may also establish communication links between controller 24 and one or more portable devices 18A, 18B in physical contact with the individuals to allow those individuals to receive warnings from system 12 (e.g. a driving instructor supervising a road test from outside the vehicle or an operator supervising autonomous vehicle maneuvers or exercising remote control of vehicle 10). Accordingly, in step 78 controller 24 may determine whether additional portable devices 18A, 18B should receive communications regarding the same alert condition and, if so, repeat steps 70, 72, 76 to generate and transmit an output signal to the additional device(s) 18A, 18B to cause a vibratory movement of the additional device 18A, 18B to alert a vehicle occupant 14 or another individual to the safety condition. The vibratory movement of the additional device 18A, 18B may be the same as the vibratory movement for the initial device 18A, 18B or may vary depending on how the controller 24 has been configured by the occupant 14 or other individual. In other embodiments, the portable device 18A, 18B may be used as an early indicator of an alert condition in advance of a warning issued by a conventional warning system. In this manner, a vehicle occupant 14 can also be prepared for an audio or other warning perceived as unnecessary to reduce any annoyance that might accompany conventional warnings. Controller 24 may therefore be configured to determine whether conventional warning systems should receive communications regarding the same alert condition and, if so, perform steps similar to steps 70 and 76 to generate and transmit an output signal to at least one of an audio warning system of the vehicle 10, a visual warning system of the vehicle 10, and a haptic warning system of the vehicle 10 (e.g., vehicle seat 52) either directly or indirectly (e.g., through control module 38)

Once output signals have been transmitted to all portable devices 18A, 18B and any other warning systems that are supposed to receive a given alert, controller 24 awaits receipt of any additional input signals from safety system 22 or any additional safety systems to which controller 24 is coupled in step 80. Controller 24 may receive another input signal that is indicative of a different alert condition. The difference in the alert condition may be in terms of the nature of the condition or the associated risk or threat of the condition. For example, one input signal may indicate a risk of a forward collision, a different input signal may indicate a risk of a side collision, and yet another input signal may indicate the simultaneous risk of both a front and side collision (e.g., during a last second lane change). Alternatively, one input signal may indicate that a first distance separates the vehicle 10 from an object while a second input signal indicates a second distance between the vehicle 10 and object as the vehicle approaches the object and the risk of collision increases. Whenever an additional input signal is detected, steps 68, 70, 72, 74, 76 are repeated resulting in generation and transmission of an additional output signal to portable devices 18A, 18B. If the additional input signal is indicative of a different alert condition, the additional output signal may be configured to cause a different vibratory movement in the haptic actuators 16 of devices 18A, 18B in terms of one or more of intensity, frequency, or duration or to cause a vibratory movement in a different haptic actuator in devices 18A, 18B (e.g., with movement of different actuators 16 in a given device 18A, 18B indicative of the direction of a crash threat). In some embodiments, controller 24 may be configured to generate and transmit the additional output signal to another warning system in the vehicle 10. For example, controller 24 may generate an alert to a vehicle occupant or occupants 14 through portable device 18A, 18B when a first alert condition is detected by vehicle safety system 22 and an alert to the occupants through a conventional warning system when a second alert condition is detected that indicates, for example, a more substantial risk than the first alert condition. In these embodiments, controller 24 may be configured to transmit the additional output signal to at least one of an audio warning system of the vehicle 10, a visual warning system of the vehicle 10, and a haptic warning system of the vehicle 10 (e.g., vehicle seat 52) either directly or indirectly (e.g., through control module 38).

A system 12 and method for generating alerts to vehicle occupants in accordance with the present teachings is advantageous relative to conventional alert systems. Relative to visual alerts, the haptic alerts generated by the system 12 and method described herein offer the advantage that an occupant 14 (e.g., the driver) does not need to be looking in any particular direction (e.g., toward the visual alert) in order to detect and respond appropriately to the alert. Relative to auditory alerts, haptic alerts may be more effective at enabling the driver to identify safety concerns because factors such as the number and position of speakers, existence of rear speakers, occupant seat/eye/ear positioning, interior ambient noise, cabin architecture and materials, and objects and passengers inside the vehicle can all impact the effectiveness of auditory alerts. In addition, relative to auditory collision alerts, haptic alerts are likely to be perceived as less annoying to drivers (and passengers) during false alarms since haptic alerts can be restricted to a single occupant 14 and do not interrupt ongoing audio entertainment. As a result, vehicle occupants 14 are less likely to disable the warning system and the safety benefits of vehicle safety systems are more likely to be achieved. The use of haptic alerts also improves the effectiveness of vehicle safety systems 22 for hearing-impaired occupants. Finally, by using portable devices 18A, 18B that already contain haptic actuators 16, the system 12 and method enable haptic alerts without adding significant costs and complexity to the vehicle 10.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for generating an alert to one or more occupants of a vehicle, comprising the steps of:
receiving a first input signal from a first vehicle safety system, said first input signal indicative of a first alert condition;
generating a first output signal responsive to said first input signal; and,
wirelessly transmitting said first output signal to a first portable device having a first haptic actuator, the first portable device configured to be mechanically disconnected from the vehicle while in physical contact with a first occupant of the vehicle;

wherein said first output signal is configured to activate the first haptic actuator to cause a first vibratory movement of the first portable device;

wherein, prior to receiving the first input signal, a signal is wirelessly transmitted to the first portable device, the signal configured to prevent activation of the haptic actuator in the absence of the first output signal.

2. The method of claim 1 wherein the first vehicle safety system comprises a collision avoidance or mitigation system.

3. The method of claim 1 wherein the first portable device comprises a cellular communications device.

4. The method of claim 1 wherein the first portable device comprises a wearable device configured to be supported by a member of a body of the first occupant.

5. The method of claim 1, further comprising the steps of:
generating a second output signal responsive to said first input signal; and,
wirelessly transmitting said second output signal to a second portable device having a haptic actuator, said second portable device configured to be mechanically disconnected from the vehicle while in physical contact with one of the first occupant of the vehicle and a second occupant of the vehicle;
wherein said second output signal is configured to activate the haptic actuator of the second portable device to cause a second vibratory movement of the second portable device.

6. The method of claim 1, further comprising the steps of:
generating a second output signal responsive to said first input signal; and,
wirelessly transmitting said second output signal to a second portable device having a haptic actuator, said second portable device located outside of the vehicle and in physical contact with a person;
wherein said second output signal is configured to activate the haptic actuator of the second portable device to cause a second vibratory movement of the second portable device.

7. The method of claim 1, further comprising the steps of:
generating a second output signal responsive to said first input signal; and,
transmitting, after wirelessly transmitting said first output signal, a second output signal to at least one of an audio warning system of the vehicle, a visual warning system of the vehicle, and a haptic warning system of the vehicle, the second output signal configured to cause the at least one of the audio warning system, visual warning system and haptic warning system to generate an audio, visual, or haptic warning, respectively, to the first occupant.

8. The method of claim 1, further comprising the steps of:
receiving a second input signal from the first vehicle safety system, said second input signal indicative of a second alert condition different from said first alert condition;
generating a second output signal responsive to said second input signal; and,
transmitting said second output signal to at least one of an audio warning system of the vehicle, a visual warning system of the vehicle, and a haptic warning system of the vehicle.

9. The method of claim 8 wherein the haptic warning system comprises a vehicle seat comprising a haptic actuator.

10. The method of claim 1, further comprising the steps of:
receiving a second input signal from the first vehicle safety system, said second input signal indicative of a second alert condition different from said first alert condition;
generating a second output signal responsive to said second input signal; and,
wirelessly transmitting said second output signal to the first portable device;
wherein said second output signal is configured to activate a second haptic actuator of the first potable device to cause a second vibratory movement of the first portable device.

11. The method of claim 1, further comprising the steps of:
receiving a second input signal from one of the first vehicle safety system and a second vehicle safety system, said second input signal indicative of a second alert condition different from said first alert condition;
generating a second output signal responsive to said second input signal; and,
wirelessly transmitting said second output signal to the first portable device;
wherein said second output signal is configured to activate the first haptic actuator to cause a second vibratory movement of the first portable device, the second movement different from the first movement in at least one of duration, frequency and intensity.

12. A method for generating an alert to one or more occupants of a vehicle, comprising the steps of:
receiving a first input signal from a first vehicle safety system, said first input signal indicative of a first alert condition;
receiving a second input signal from one of the first vehicle safety system and a second vehicle safety system, said second input signal indicative of a second alert condition different from said first alert condition;
generating a first output signal responsive to said first input signal;
generating a second output signal responsive to said second input signal;
wirelessly transmitting said first and second output signals to a first portable device having a haptic actuator, the first portable device configured to be mechanically disconnected from the vehicle while in physical contact with a first occupant of the vehicle wherein said first output signal is configured to activate the haptic actuator to cause a first vibratory movement of the first portable device and said second output signal is configured to activate the haptic actuator to cause a second vibratory movement of the first portable device, the second vibratory movement different from the first vibratory movement in at least one of duration, frequency and intensity;
associating the first vibratory movement with said first input signal responsive to a first configuration signal; and,
associating the second vibratory movement with said second input signal responsive to a second configuration signal;
wherein, prior to receiving the first and second input signals, a signal is wirelessly transmitted to the first portable device, the signal configured to prevent activation of the haptic actuator in the absence of one of the first and second output signals.

13. The method of claim 12 wherein said first and second configuration signals are received from the first portable device.

14. A system for generating an alert to one or more occupants of a vehicle, comprising:
a first vehicle safety system; and,
a controller coupled to said first vehicle safety system and configured to:
receive a first input signal from said first vehicle safety system, said first input signal indicative of a first alert condition;
generate a first output signal responsive to said first input signal; and,
wirelessly transmit said first output signal to a first portable device having a haptic actuator, the first portable device configured to be mechanically disconnected from the vehicle while in physical contact with a first occupant of the vehicle;
wherein said first output signal is configured to activate the haptic actuator to cause a first vibratory movement of the first portable device;
wherein, prior to receiving the first input signal, a signal is wirelessly transmitted to the first portable device, the signal configured to prevent activation of the haptic actuator in the absence of the first output signal.

15. The system of claim 14 wherein said controller is further configured to receive said first input signal over a vehicle communications bus, configures said first output signal for short-range wireless transmission to said first portable device and transmits said first output signal directly to said first portable device.

16. The system of claim 14 wherein said controller is further configured to:
generate a second output signal responsive to said first input signal; and,
wirelessly transmit said second output signal to a second portable device having a haptic actuator, said second portable device configured to be mechanically disconnected from the vehicle while in physical contact with one of the first occupant of the vehicle and a second occupant of the vehicle;
wherein said second output signal is configured to activate the haptic actuator of the second portable device to cause a second vibratory movement of the second portable device.

17. The system of claim 14 wherein said controller is further configured to:
receive a second input signal from the first vehicle safety system, said second input signal indicative of a second alert condition different from said first alert condition;
generate a second output signal responsive to said second input signal; and,
transmit said second output signal to at least one of an audio warning system of the vehicle, a visual warning system of the vehicle, and a haptic warning system of the vehicle.

18. The system of claim 14 wherein said controller is further configured to:
receive a second input signal from one of the first vehicle safety system and a second vehicle safety system, said second input signal indicative of a second alert condition different from said first alert condition;
generate a second output signal responsive to said second input signal; and,
wirelessly transmit said second output signal to the first portable device;
wherein said second output signal is configured to activate the haptic actuator to cause a second vibratory movement of the first portable device, the second vibratory movement different from the first vibratory movement in at least one of duration, frequency and intensity.

19. The system of claim 18 wherein said controller is further configured to:
associate the first vibratory movement with said first input signal responsive to a first configuration signal received by said controller; and,
associate the second vibratory movement with said second input signal responsive to a second configuration signal received by said controller.

20. The method of claim 14, further said controller is further configured to transmit a third output signal to at least one of an audio warning system of the vehicle, a visual warning system of the vehicle, and a haptic warning system of the vehicle in the event of a loss of communication between said controller and the first portable device, said third output signal configured to cause the at least one of the audio warning system, the visual warning system and the haptic warning system to generate a warning indicative of the loss of communication.

* * * * *